Jan. 11, 1938.  W. F. HOERLE  2,105,354

BALL BEARING SKATE WHEEL

Filed Dec. 2, 1933

INVENTOR
William F. Hoerle.
BY
ATTORNEY

Patented Jan. 11, 1938

2,105,354

UNITED STATES PATENT OFFICE 2,105,354

BALL BEARING SKATE WHEEL

William F. Hoerle, Torrington, Conn., assignor to Union Hardware Company, Torrington, Conn., a corporation of Connecticut Application December 2, 1933, Serial No. 700,697

2 Claims. (Cl. 308—191)

My invention relates to wheels for what are commonly termed roller skates.

The main object is to provide a cheap but high grade wheel which can be readily manufactured according to standard specifications.

A special object is to provide a construction of this character in which the hub consists of a minimum number of parts.

In carrying out the invention the hub is preferably formed of two parts with ball recesses facing toward each other. These two parts are provided with interfitting flanges at their meeting ends which are welded together as a part of the assembling operation. The rotating member of the wheel is suitably constructed in advance and provided with outwardly facing bearing rings and the hub parts together with the ball bearings are inserted into these bearing rings from opposite sides.

Figure 1:
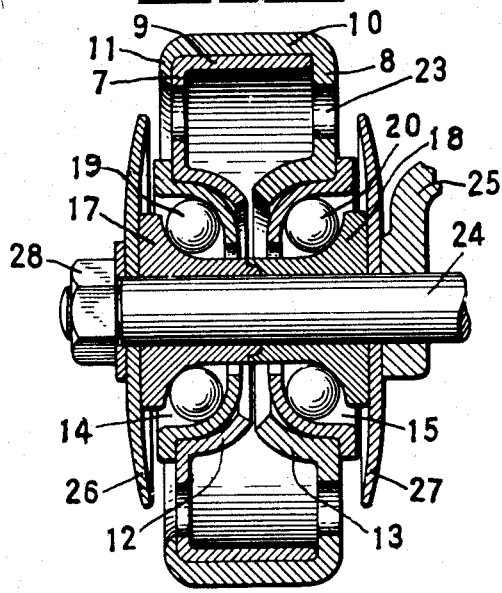
Fig. 1 is a sectional view of a construction embodying one form of my invention.
Figure 2:
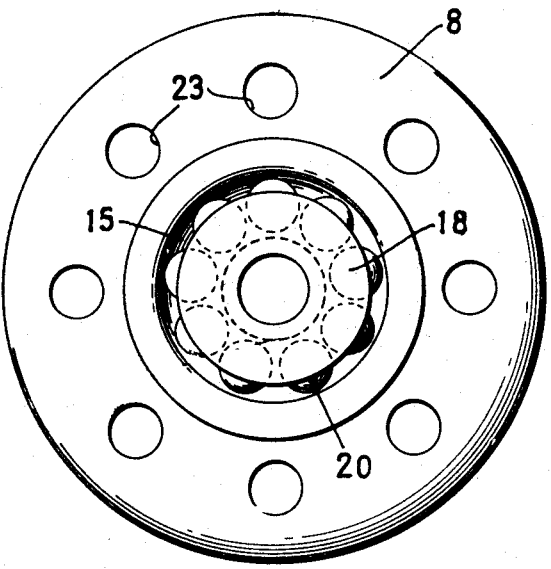
Fig. 2 is a side view of the same but omitting the supporting shaft.
Figure 3:
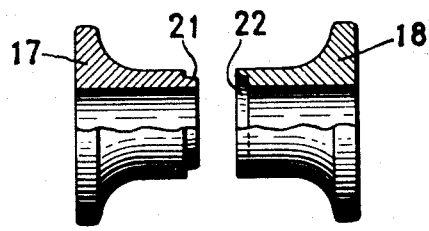
Fig. 3 shows the two hub parts in side elevation and partial section before assembly.
Figure 5:
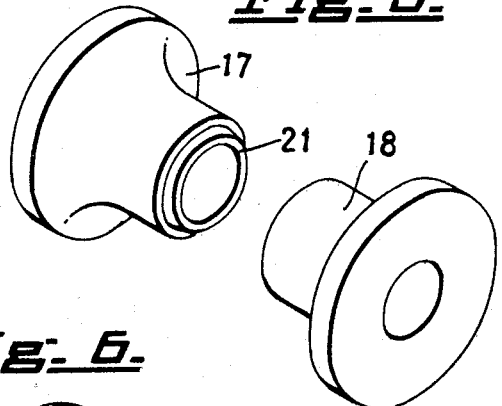
Fig. 5 is an exploded perspective view of the two hub parts.
Figure 4:
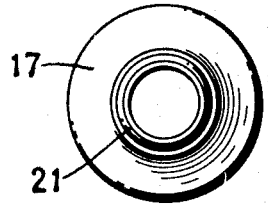
Fig. 4 is a view of the inner end of one of the hub parts.
Figure 6:
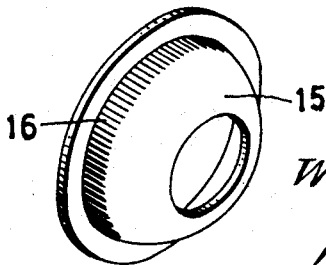
Fig. 6 is a perspective view of one of the bearing rings of the rotor.

The rotating member or rotor is suitably formed for instance of two web members 7 and 8 having interfitting flanges 9 and 10, the latter being spun over at 11 to lock the parts together. The web members are provided with inwardly turned socket portions 12 and 13 to receive the bearing rings 14 and 15. These bearing rings are preferably formed of hardened steel and provided with external knurled portions or teeth 16 which are forced into the sockets when the bearing rings are assembled in the tread members. These parts are so dimensioned that the mere forcing of the bearing ring into the socket causes the teeth 16 to cut into the softer metal of the socket and permanently unite the parts.

The hub member consists of the two parts 17 and 18 which are commonly termed cones and have raceways of the usual sort for the ball bearings 19 and 20.

These hub parts are provided with flanges 21 and 22 on their meeting ends which flanges fit together one within the other. Preferably these flanges are somewhat tapered so as to accurately center the two hub parts with respect to each other. The parts of the rotor are provided with openings 23 which serve as ventilating passages.

In manufacturing the wheel the rotor parts are first assembled and the hub parts are then inserted into the opposite sides together with the ball bearings. The hub parts are then forced together and welded by the passage of an electric current which unites the thin flanges 21 and 22. It will be understood, of course, that the hub parts 17 and 18 which constitute the inner bearing members will be of hardened steel to properly withstand the wear of the hardened steel balls. It is important therefore that the parts shall be so designed and assembled that the heat of the welding operation will not draw the temper of the raceways or of the hardened balls which are, of course, already in place as above mentioned.

This result is accomplished by locating the junction between the hub parts substantially in the center of the wheel and out of contact with the other metal parts. It is possible, therefore, for air to circulate around the ball bearings and through the raceways so as to prevent over heating.

In the assembly of this wheel it is customary to mount the parts upon the stationary shaft 24 which in turn is held in a bracket or frame 25. Dust guards or washers 26 and 27 are also usually employed and the parts tightly connected together by a nut 28 on one end of the shaft.

It will thus be seen that the hub portion is held stationary so that there is no wear between the parts of the hub and the supporting shaft.

I claim:

1. A roller skate wheel comprising a rotating member with a tread surface, two separated cup-like members arranged with bearing faces facing outwardly away from each other and toward the axis of the wheel; two cone members arranged coaxially with respect to the cup-like members but spaced therefrom and having bearing faces facing inwardly; ball bearings disposed between the respective cone members and the corresponding cup-like members; each of said cone members having a thin flange on its inner end, said flanges being disposed in overlapping relationship so as to center and align the one cone member with respect to the other cone member, said overlapped flanges being spaced from the rotating member and cup-like members and being adapted to melt under passage of a current of electricity so as to cause autogenous welding of one with the other, the bearing portions of said cone members being of harder material than the inner flanged portions and also being spaced a sufficient distance from said inner portions so as not to be affected by the heat of the welding.

2. As an article of manufacture, a bearing for a roller skate wheel composed of two separated cup-like members arranged with bearing faces facing outwardly away from each other and toward the axis of the bearing; two cone members arranged coaxially with respect to the cup-like members but spaced therefrom and having bearing faces facing inwardly; ball bearings disposed between the respective cone members and the corresponding cup-like members; said cone members having interfitting tapered overlapped inner and outer flanges respectively at their inner ends positioned in the space between the cup-like members and being welded together; the bearing portions of said cone members being of harder material than their inner flanges, said bearing portions being spaced a sufficient distance from the inner flanges so as not to be affected by the heat of the welding; the cup-like members having walls substantially interposed between the ball bearings and the inner welded ends of the cone members; said overlapping portions of the cone members being adapted to melt under passage of a current of electricity so as to cause autogenous welding of one with the other and being adapted to be welded after assembly in the bearing.

WILLIAM F. HOERLE.